(12) United States Patent
Bartolomeo

(10) Patent No.: US 11,703,091 B2
(45) Date of Patent: Jul. 18, 2023

(54) CONE CLUTCH SYSTEM

(71) Applicant: Rolls-Royce Corporation, Indianapolis, IN (US)

(72) Inventor: Mark E. Bartolomeo, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 6 days.

(21) Appl. No.: 17/446,893

(22) Filed: Sep. 3, 2021

(65) Prior Publication Data

US 2023/0073023 A1 Mar. 9, 2023

(51) Int. Cl.
| | |
|---|---|
| *F16D 13/26* | (2006.01) |
| *F16D 13/72* | (2006.01) |
| *F16D 13/66* | (2006.01) |
| *F02C 7/32* | (2006.01) |

(52) U.S. Cl.
CPC .............. *F16D 13/26* (2013.01); *F16D 13/66* (2013.01); *F16D 13/72* (2013.01); *F02C 7/32* (2013.01)

(58) Field of Classification Search
CPC .......... F16D 13/26; F16D 13/66; F16D 13/72; F16D 2065/132; F16D 2065/1328
See application file for complete search history.

(56) References Cited

U.S. PATENT DOCUMENTS

| | | |
|---|---|---|
| 2,865,481 A | 12/1958 | De Termala |
| 3,300,004 A | 1/1967 | Peterson |
| 3,823,802 A | 7/1974 | Winzeler et al. |
| 4,030,583 A | 6/1977 | Miller |
| 4,262,789 A | 4/1981 | Collins |
| 4,593,801 A | 6/1986 | Tekeuchi et al. |
| 6,834,751 B1 | 12/2004 | Magee |
| 7,308,977 B2 | 12/2007 | Maguire et al. |
| 8,051,968 B2 | 11/2011 | Arnold et al. |
| 8,100,239 B2 | 1/2012 | Swanson et al. |
| 8,893,868 B2 | 11/2014 | Kennedy |
| 9,921,037 B2 | 3/2018 | Wadley et al. |

(Continued)

FOREIGN PATENT DOCUMENTS

| | | | | |
|---|---|---|---|---|
| EP | 1342932 B1 * | 4/2008 | ........... | C04B 35/013 |
| EP | 3273085 A1 | 1/2018 | | |

OTHER PUBLICATIONS

U.S. Appl. No. 17/564,288, filed Dec. 29, 2021, by Black et al.

(Continued)

*Primary Examiner* — Lori Wu
(74) *Attorney, Agent, or Firm* — Shumaker & Sieffert, P.A.

(57) ABSTRACT

In some examples, a cone clutch assembly includes an inner cone member rotationally coupled to a first shaft, the inner cone member defining a first friction surface; and an outer cone member rotationally coupled to a second shaft, the outer cone member defining a second friction surface opposing the first friction surface. The inner cone member and outer cone member may be selectively engaged and disengaged from another. The inner cone member and/or the outer cone member may include a first metallic layer and a second metallic layer separated by an open structure core. The open structure core is configured to allow flow of a fluid between the first metallic layer and the second metallic layer to remove heat from the at least one of the inner cone member or the outer cone member.

20 Claims, 7 Drawing Sheets

(56) References Cited

U.S. PATENT DOCUMENTS

| | | | |
|---|---|---|---|
| 10,830,286 B2 | 11/2020 | Zhang et al. | |
| 2004/0159524 A1 | 8/2004 | Carpenter et al. | |
| 2006/0049017 A1 | 3/2006 | Furuichi | |
| 2006/0180423 A1 | 8/2006 | Kos et al. | |
| 2007/0023253 A1 | 2/2007 | Wayman | |
| 2009/0114498 A1 | 5/2009 | Arnold et al. | |
| 2011/0259699 A1 | 10/2011 | Swanson | |
| 2015/0211586 A1 | 7/2015 | Hutchinson | |
| 2015/0267765 A1* | 9/2015 | Kim | F16D 13/72 192/113.21 |
| 2016/0084321 A1* | 3/2016 | Mihajlovic | F16D 25/0632 192/66.22 |
| 2016/0178016 A1 | 6/2016 | Swift et al. | |
| 2018/0112720 A1* | 4/2018 | Choi | F16D 13/32 |
| 2018/0266493 A1 | 9/2018 | Dempfle et al. | |
| 2019/0120309 A1* | 4/2019 | Sung | F16D 65/125 |
| 2021/0054883 A1 | 2/2021 | Grethel et al. | |
| 2021/0207671 A1* | 7/2021 | Siegel | F16D 69/02 |

OTHER PUBLICATIONS

U.S. Appl. No. 17/930,192, filed Sep. 7, 2022, naming inventor Black.

U.S. Appl. No. 17/930,239, filed Sep. 7, 2022, naming inventor Black.

Zelinski, "Lighter, Better-Performing Brake Rotor From 3D Printing: The Cool Parts Show #27," Additive Manufacturing, Mar. 31, 2021, 6 pp.

Lighter Rotors More Muscle, retrieved from https://www.ceramicdisctech.com on Jul. 21, 2021, 2 pp.

\* cited by examiner

CONE CLUTCH SYSTEM

This invention was made with Government support under contract no. W911W6-19-9-0005 awarded by the Department of Defense. The Government has certain rights in the invention.

TECHNICAL FIELD

The disclosure relates to cone clutch assemblies and systems that include the same.

BACKGROUND

Gas turbine engines include various accessory components to enable the engine to operate, such as, for example, fuel pumps, oil pumps, electric generators and/or motors. Often, accessory components are driven by a turbine through an accessory gearbox. In some implementations, accessory components are rotationally coupled to the accessory gearbox using a mechanical clutch, which allows selective disconnection of the accessory components from the gearbox and turbine when the accessory components are not needed.

SUMMARY

The disclosure describes cone clutch assemblies, systems including such assemblies, and techniques for making and using the same. An example cone clutch assembly may include an inner cone member (or "male cone") that is configured to selectively engage an outer cone member (or "female cone"), e.g., with one or more layers of a friction material between the opposing surfaces of the inner and outer cone members. At least a portion of the inner cone member and/or outer cone member (e.g., portions of the cone member defining or near a friction surface) may be formed with a metallic shelled sandwich structure having open structure core between metallic walls. The open structure core may be structured so that open flow pathways are present between the metallic walls, e.g., to allow a cooling fluid such as air or a cooling oil to flow within the core to cool or otherwise remove heat from the cone member. The centrifugal forces resulting from the rotation of the respective one member may move the cooling fluid through the open core structure, e.g., without the use of a pump. In some examples, the open structure core may be a ceramic or metallic material forming a lattice structure, e.g., using an additive manufacturing process or other suitable process.

In some examples, the disclosure describes a cone clutch assembly comprising: an inner cone member configured to be rotationally coupled to a first shaft, the inner cone member defining a first friction surface; and an outer cone member configured to be rotationally coupled to a second shaft, the outer cone member defining a second friction surface opposing the first friction surface, wherein the inner cone member and outer cone member are configured to be selectively engaged and disengaged from each other, wherein, when the inner cone member is engaged with the outer cone member, the first friction surface of the inner cone member frictionally engages the second friction surface of the outer cone member such that rotational motion is transferred between the inner cone member and the outer cone member, and wherein at least one of the inner cone member or the outer cone member include a first metallic layer and a second metallic layer separated by an open structure core, wherein the open structure core is configured to allow flow of a fluid between the first metallic layer and the second metallic layer to remove heat from the at least one of the inner cone member or the outer cone member.

In some examples, the disclosure describes a method of operating a cone clutch assembly, the method comprising: engaging an inner cone member with the outer cone member, wherein the inner cone member is rotationally coupled to a first shaft and defines a first friction surface, wherein the outer cone member is rotationally coupled to a second shaft and defines a second friction surface opposing the first friction surface, wherein, when the inner cone member is engaged with the outer cone member, the first friction surface of the inner cone member frictionally engages the second friction surface of the outer cone member such that rotational motion is transferred between the inner cone member and the outer cone member, and wherein at least one of the inner cone member or the outer cone member include a first metallic layer and a second metallic layer separated by an open structure core, wherein the open structure core is configured to allow flow of a fluid between the first metallic layer and the second metallic layer to remove heat from the at least one of the inner cone member or the outer cone member.

The details of one or more examples are set forth in the accompanying drawings and the description below. Other features, objects, and advantages will be apparent from the description and drawings, and from the claims.

DETAILED DESCRIPTION

Figure 1:
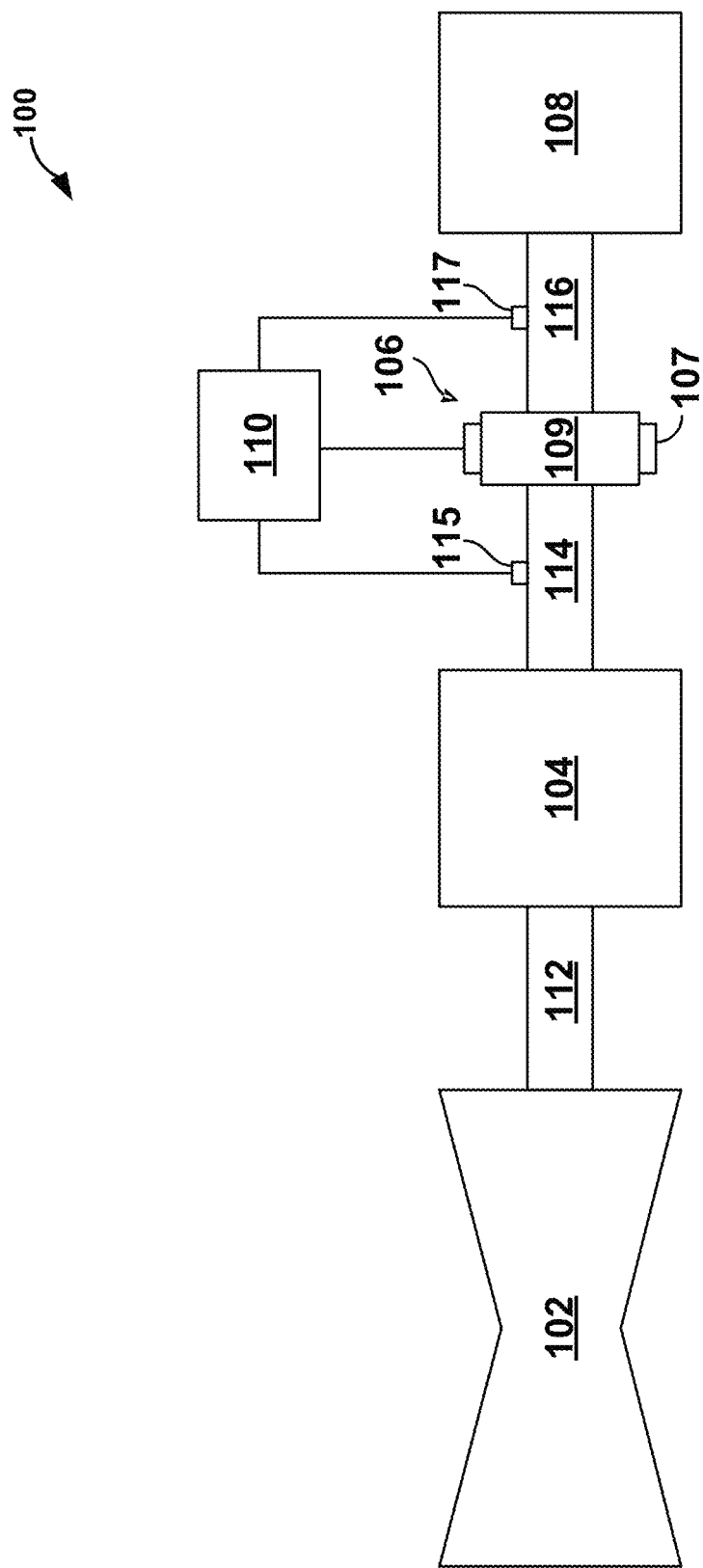
FIG. 1 is a conceptual diagram illustrating an example system including an example cone clutch assembly.

The disclosure generally describes systems including a cone clutch assembly, and techniques for using the same. The cone clutch assembly may include an inner cone member (or "male cone") that is configured to selectively engage an outer cone member (or "female cone"), e.g., with one or more layers of a friction material between the opposing surfaces of the inner and outer cone members. At least a portion of the inner cone member and/or outer cone member (e.g., portions of one or both cone members defining or near a friction surface) may be formed with a metallic shelled sandwich structure having open structure core between metallic walls. The open structure core may be structured so that open flow pathways are present between the metallic walls, e.g., to allow a cooling fluid such as air or a cooling oil to flow within the core to cool or otherwise remove heat from the cone member. The centrifugal forces resulting from the rotation of the cone member(s) may move the cooling fluid through the open core structure, e.g., without the use of a pump. In some examples, the open structure core may be a ceramic or metallic material forming a lattice structure, e.g., using an additive manufacturing process or other suitable process.

In some examples, cone clutch assemblies may be used to control engagement of system accessories, such as aircraft accessories of gas turbine engine systems. In some examples, cone clutch assemblies may be employed in a helicopter design as well as in aircraft, e.g., with engines drive takeoffs from any of the gearboxes being controlled as needed by way of such clutch assemblies.

A cone clutch assembly may have an input and an output shaft selectively coupled or decoupled (also referred to as engaged and disengaged) by two mating cone members, e.g., to selectively connect and disconnect, respectively, power/motion in a driveline. The input shaft may be continually driven by prime mover such as an engine or motor. The output shaft of the clutch can be engaged or disengaged from the prime mover allowing it to drive or disconnect driven assemblies such as gearboxes, fans, generators, etc. The cone members may be selectively engaged or coupled together by application of an axial force to clamp the inner (male) and outer (female) cone members together via friction. Typically, one cone member may be constructed from steel and the other member incorporates a friction liner to uniformly control friction and provide wear resistance. The liner may be used to control friction and improve wear resistance, and may be fabricated from materials such as bronze, carbon/carbon, Kevlar fiber encapsulated by a binder material or other friction tolerant materials to provide the clutch function. The steel cone member may be case or core hardened for durability.

Many clutches use friction (dry or viscous) elements to allow transmission of power/motion to engage and/or disengage the clutch cone members. Also, many clutches use slippage to allow the output to input speeds to become synchronous and/or allow one cone member to slow down and stop relative to the other. During the operation of a clutch assembly, slippage of drive elements can result in large heat generation that needs to be used up, dissipated or cooled.

Cone clutches may offer a number of significant advantages over other styles of clutches in terms of compact packaging and low weight. Power density and circumferential velocities at the rubbing surfaces control the package size of the arrangement. These limitations are driven by wear and temperatures at the rubbing surfaces of the clutch.

However, the two mating cone members can be difficult to cool, particularly for high speed/high tip velocity applications. Without cooling, excessive and potentially destructive heat generation may result from the operation of cone clutch assemblies. In some examples, oil (or other fluid) supply may be delivered directly to the friction surfaces of the cone members as a cooling medium. But the friction interface between the cone members can be very difficult to oil cool as active cooling may only take place before and after the clutch engagement. During the engagement, the cooling fluid flow is cut off at the friction interface. Cooling channels may be added to the friction liner mounted on the outer cone member (female) to provide a path for oil cooling. However, the inner cone member (male) may still be difficult to cool with this arrangement since cooling oil is driven out to the outer/female cone member via windage and/or centrifugal forces. Additionally, cone element architecture with solid metal cone members may results in excessive weight of the cone clutch assembly as well as excessive cost for manufacture of the assembly.

In accordance with examples of the disclosure, cone clutch assemblies are described where least a portion of the inner cone member and/or outer cone member (e.g., portions of one or both cone members defining or near a friction surface) may be formed with a metallic shelled sandwich structure having open structure core between metallic walls. The open structure core may be structured so that open flow pathways are present between the metallic walls, e.g., to allow a cooling fluid such as air or a cooling oil to flow within the core to cool or otherwise remove heat from the cone member. The centrifugal forces resulting from the rotation of the cone member(s) may move the cooling fluid through the open core structure, e.g., without the use of a pump. In some examples, the open structure core may be a ceramic or metallic material forming a lattice structure, e.g., using an additive manufacturing process or other suitable process.

One or more examples of the disclosure may provide for one or more advantages. For example, examples of the metallic shelled sandwich structures described herein may allow for a unique technique of cooling of one or more of an inner or outer cone member by way of fluid (e.g., air or oil) cooling through the core of a respective cone member, e.g., in a volume adjacent to the friction surface. Centrifugal force of the rotating cone member(s) may move the cooling fluid through the open structure core such that a pump is not needed to cause the fluid to flow within the cone member(s). Because of the enhanced cooling, higher power applications for cone clutch assemblies may be possible. Additionally, or alternatively, the use of example metallic shelled sandwich structures with open structure cores for the cone member(s) may provide for relatively light weight cone clutch assemblies, e.g., as compared to assemblies that employ solid metal cone members. Additionally, or alternatively, as described herein, in some examples, the metallic shelled sandwich structures with open structure cores for the cone member(s) may be manufactured using additive manufacturing techniques, which may allow for additive manufacturing for production all in one set up.

FIG. 1 is a conceptual diagram illustrating an example system 100 including cone clutch assembly 106. System 100 may include, for example, an engine 102, an accessory gear box 104, cone clutch assembly 106, an accessory component 108 (accessory 108), and a controller 110. As will be described further below, clutch assembly 106 includes two cone clutch members 109 (individually shown as outer cone member 122 and inner cone member 124 in FIG. 2 for example). System 100 may include any suitable mechanical system. In some examples, system 100 may include at least a portion of a mechanical system of a vehicle powered by an internal combustion engine. In some examples, system 100 may include at least a portion of a mechanical system of an aircraft powered by a gas turbine, engine, electric, hybrid, or other type of engine.

Engine 102 is mechanically coupled to accessory gear box 104 via drive shaft 112. Engine 102 is configured to rotate (e.g., drive) drive shaft 112. Although illustrated as a gas turbine engine, in other example, engine 102 may include other devices configured to output shaft work, such as internal combustion engines, fuel cells, electric motors or generators, pneumatic motors, or hydraulic motors.

Drive shaft 112 may include any suitable shaft and/or gear system to transfer shaft work from engine 102 to accessory gear box 104. In examples in which engine 102 includes a gas turbine engine, drive shaft 112 may include an internal gearbox including a direct drive, a stub shaft drive, an idler shaft drive, or other mechanical coupling configured to drive a radial drive shaft or tower shaft. In some examples, drive shaft 112 may include an intermediate gearbox.

Accessory gearbox 104 is configured to transfer shaft work from drive shaft 112 to input shaft 114. In some examples, accessory gearbox 104 may include an accessory drive of a gas turbine engine system. Input shaft 114 is configured to drive one or more accessories of system 100. Although illustrated as a single input shaft 114, system 100 may include two or more input shafts driven by drive shaft 112 via accessory gearbox 104. For example, accessory gearbox 104 may include a plurality of spur gears mechanically coupling drive shaft 112 to respective input shaft of a plurality of input shafts 114, each at a selected gear ratio.

Input shaft 114 may be selectively coupled to an output shaft 116 via cone clutch assembly 106 so that output shaft 116 is rotationally driven by input shaft 114 when cone clutch assembly 106 is engaged and, conversely, when cone clutch assembly 106 is disengaged, output shaft 116 is not driven by input shaft 114. Input shaft 114 may be coupled (e.g., rotationally fixed) to outer cone member 122 (shown in FIG. 2) of clutch assembly 106, and inner cone member 124 (shown in FIG. 2) of clutch assembly 106 may be coupled (e.g., rotationally fixed) to output shaft 116. As used herein, the outer cone member 122 may also be referred to as a female cone member, and the inner cone member 124 may also be referred to as a male cone member. Although system 100 is described herein primarily with outer cone member 122 being fixed to input shaft 114 and with inner cone member 124 being fixed to output shaft 116, in other examples, outer cone member 122 may be fixed to output shaft 116 and inner cone member 124 may be fixed to input shaft 114. Output shaft 116 is mechanically coupled to accessory 108. Accessory 108 may include, for example, one or more of fuel pumps, generators, constant speed drives, oil pumps, hydraulic pumps, compressors, engine starters, tachometer sensor drives, and auxiliary gearbox drives.

In some examples, system 100 may include at least one of rotational sensors 115 and 117. Rotational sensors 115 and 117 are configured to sense a rotational speed of input shaft 114 (or an outer cone member coupled to input shaft 114) and output shaft 116 (or an inner clutch plate coupled to output shaft 116), respectively. For example, rotational sensors 115 and/or 117 may include one or more of a reflective sensor, an interrupter sensor, an optical encoder, a variable-reluctance sensor, an eddy-current killed oscillator sensor, a Wiegand sensor, or a Hall-effect sensor. In some examples, rotational sensors 115 and/or 117 may be configured to determine a rotation of input shaft 114 or output shaft 116, respectively, based on sensing a target disposed on input shaft 114 (of the first clutch plate) or output shaft 116 (or the second clutch plate). In some examples, controller 110 may be configured to receive signals from at least one of rotational sensors 115 or 117 and control, based on a rotational speed determined based on the signal, an electrical current applied to electromagnet 107.

In the example shown in FIG. 1, controller 110 may selectively engaged and disengage clutch assembly 106 as described herein, e.g., to selectively drive output shaft 116 via input shaft 114. For example, as described further below, controller 110 may control the axial position of outer cone member 122 relative to inner cone member 124, e.g., via an actuator. To engage clutch assembly 106, controller 110 may move inner cone member 124 towards outer cone member 122 to frictionally engage opposing surfaces of members 122, 124. Conversely, to disengage clutch assembly, controller 110 may move inner cone member 124 away from outer cone member 122 to frictionally disengage opposing surfaces of members 122, 124.

Controller 110 may include, for example, a computing device, a desktop computer, a laptop computer, a workstation, a server, a mainframe, a cloud computing system, a tablet, a smart phone, or the like. Controller 110 is configured to control operation of system 100, including, for example, the position of outer cone member 122 relative to inner cone member 124. Controller 110 may be communicatively coupled to the various component of system 100 including, e.g., the actuator or other component configured to axially move inner cone member 124 relative outer cone member 122, sensors 115 and/or 117, and/or the like using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, controller 110 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Figure 2:
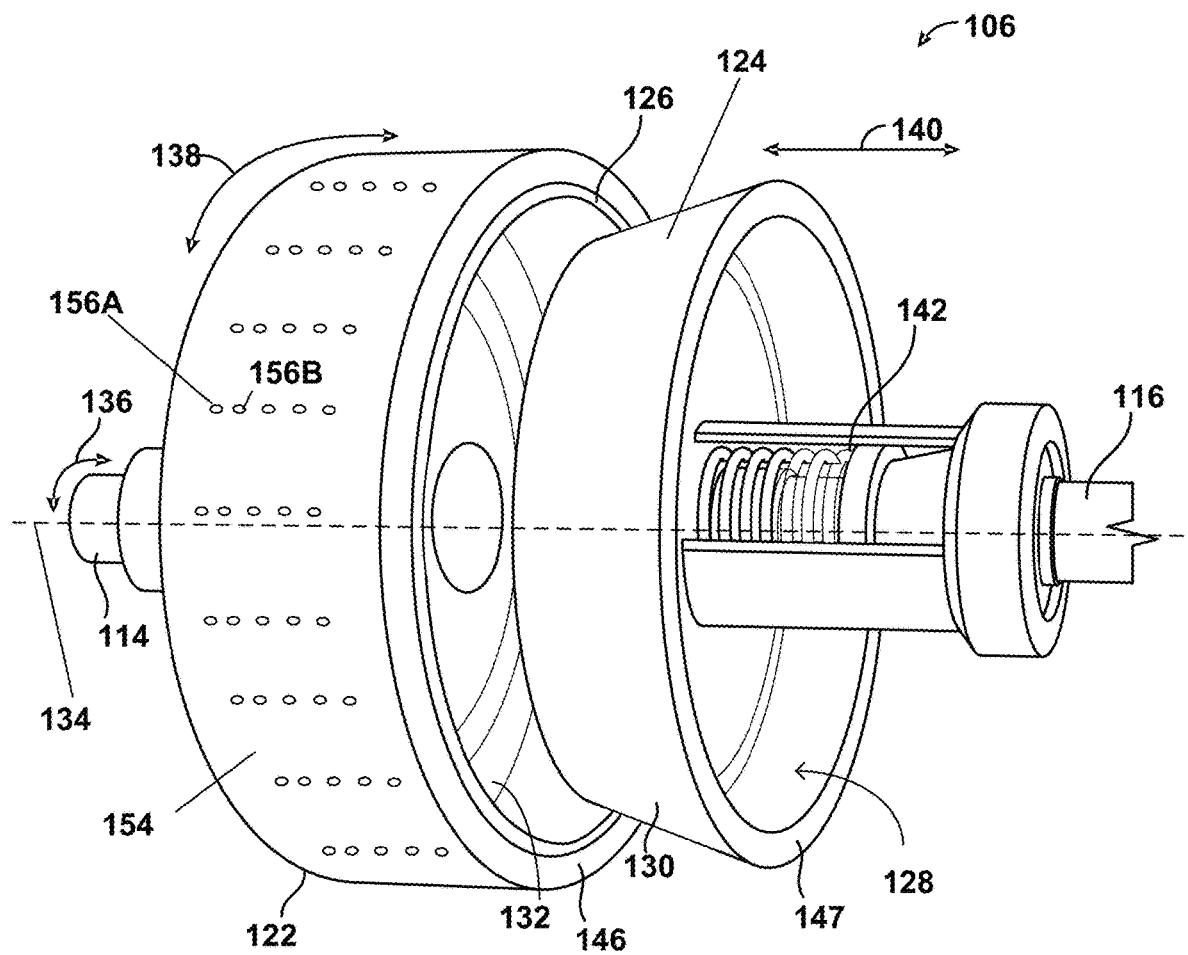
FIG. 2 is a conceptual diagram illustrating an example cone clutch assembly.
Figure 3A:
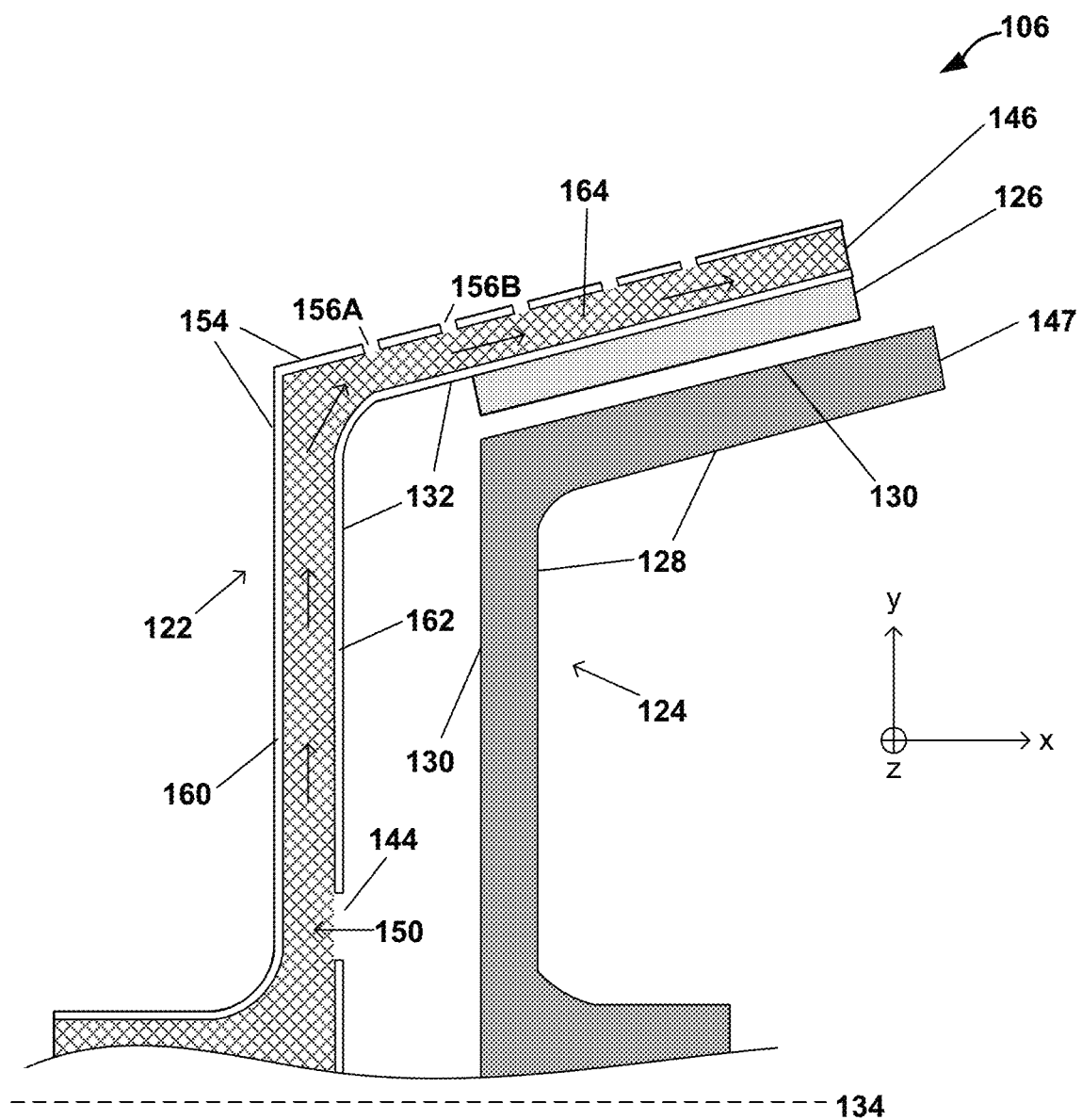
FIGS. 3A and 3B are simplified conceptual diagrams illustrating cross-sections of a portion of an example cone clutch assembly.
Figure 3B:
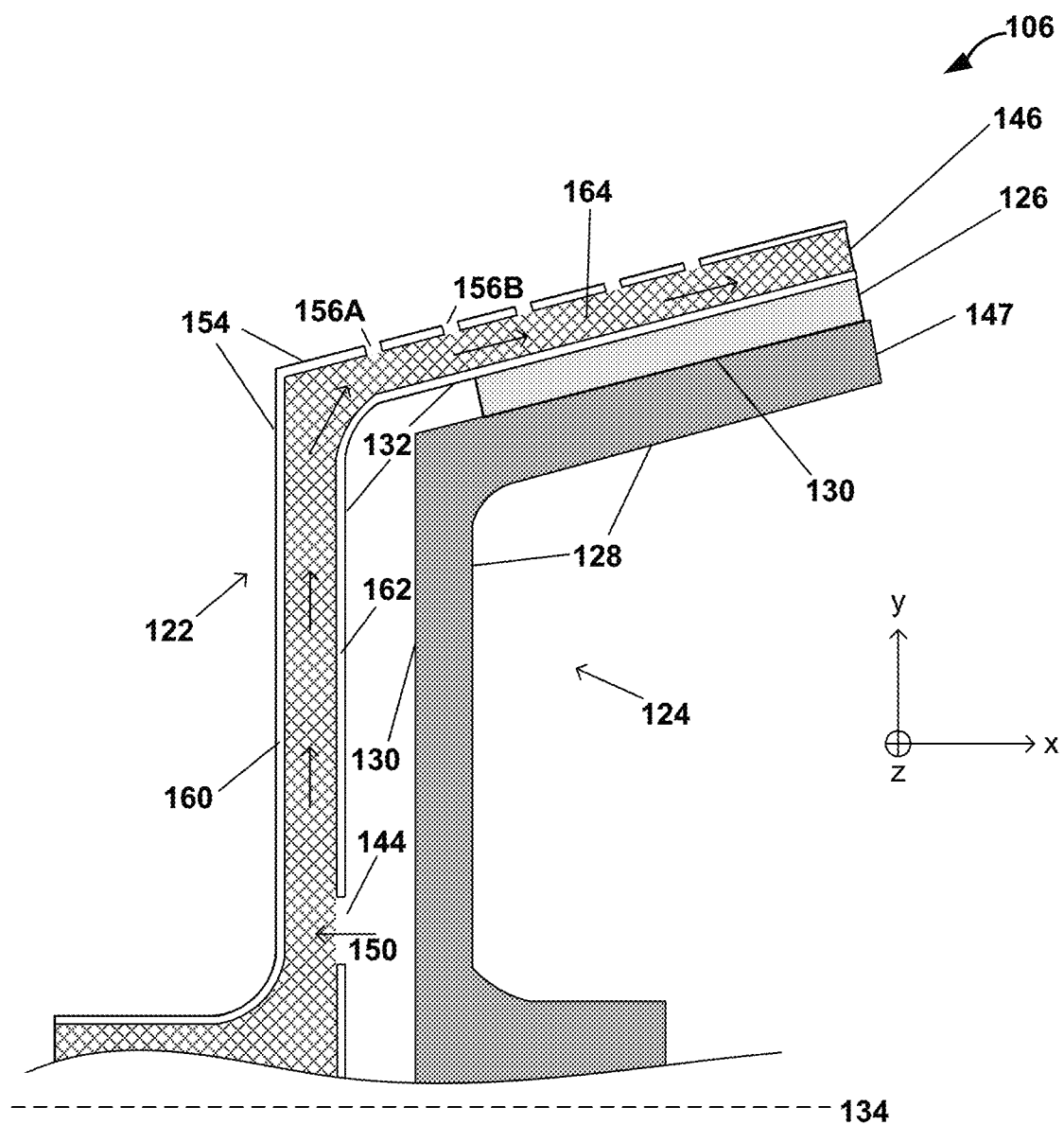
Figure 4:
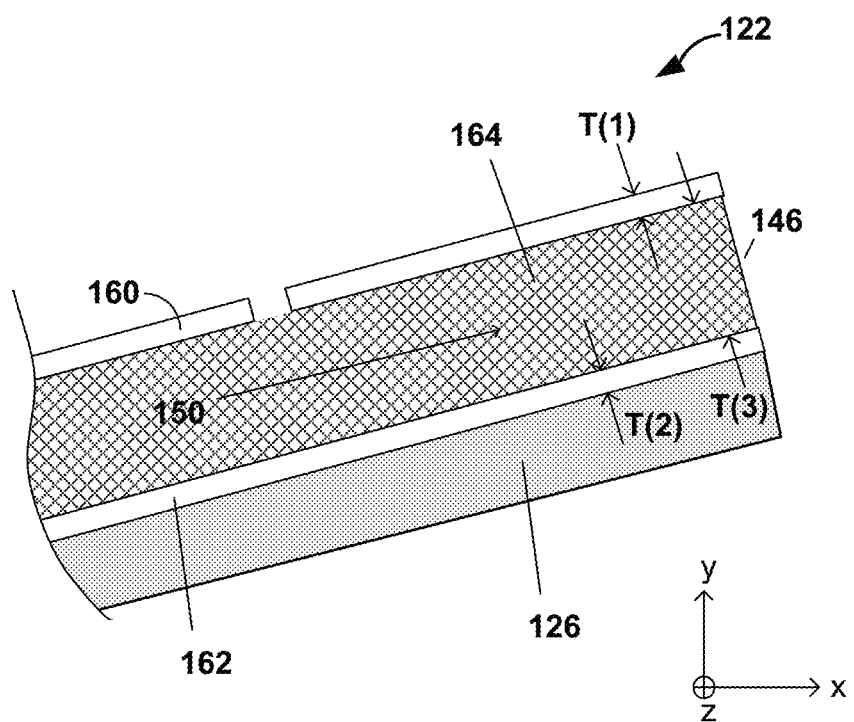
FIG. 4 is a conceptual diagram illustrating a magnified view of a portion of the outer cone member shown in FIGS. 3A and 3B.

FIG. 2 is a conceptual diagram illustrating an example cone clutch assembly 106 that may be used in system 100. FIGS. 3A and 3B are conceptual diagrams showing a simplified cross-section of a portion of cone clutch assembly 106 in engage and disengaged, respectively configurations. FIG. 4 is conceptual diagram illustrating a magnified view of a portion of outer cone member 122 shown in FIGS. 3A and 3B showing the metallic shelled structure of outer cone member 122 in further detail. While the examples of FIGS. 2-4 show outer cone member 122 having a metallic shelled sandwich structure with an open structure core 164, it is contemplated that inner cone member 124 may additionally or alternatively have the same or similar metallic shelled construction. Furthermore, while the example of FIGS. 2-4 show a system in which the outer cone member 122 is attached to the input shaft/drive and the inner cone member 124 is attached to the output shaft/drive, it is contemplated that system 100 may be configured with outer cone member 122 attached to the output shaft/drive and the inner cone member 124 may be attached to the input shaft/drive, e.g., depending on the configuration of the driveline including which of the cone members may be more easily moved axially, and the like.

Cone clutch assembly 106 includes outer cone member 122 attached or otherwise fixed (e.g., rotationally fixed) to input shaft 114, and inner cone member 124 attached or otherwise fixed (e.g., rotationally fixed) to output shaft 116. Input shaft 114 rotates about axis 134 in direction(s) 136. Likewise, output shaft 116 rotates about axis 134 when driven by input shaft 114, e.g., when clutch assembly 106 is in an engaged configuration.

Inner cone member 124 includes outer (or friction) surface 130 and inner surface 128 that opposes outer surface 130. Outer cone member 122 include inner surface 132 and outer surface 154. In the example of FIG. 2, assembly also includes friction member 126 that is located on the angled portion of inner surface 132 of outer cone member 122. In other examples, friction member 126 may additionally, or alternatively, be located on outer surface 130 of inner cone member 124. Friction member 126 may be formed of a friction material that is different material than outer cone member 122 and/or inner cone member 124. In some examples, friction member 126 may be formed of KEVLAR®, carbon fiber weave, or other composite material. In some examples, the friction material of friction member 126 may be selected to provide an optimum or otherwise advantageous compromise of friction properties, wear, thermal resilience, heat conductivity, and the like.

As shown in FIGS. 3A and 3B, with the generally conical shape, the friction surfaces of inner cone member 124 and outer cone member 122 are orientated at an angle relative to rotational axis 134 (which extends substantially parallel to the x-axis shown in FIGS. 3A and 3B) that is greater than zero and less than 90 degrees. The angle of the opposing friction surfaces of inner cone member 124 and outer cone member 122 may be generally the same so as to allow for relatively evenly distributed contact between the friction surface with the inner cone member 124 and outer cone member 122 are engaged with each other, e.g., as shown in FIG. 3B.

Inner surface 126 of outer cone member 122 extends from at or near the rotational axis 134 radially outwardly towards the angled portion of inner surface 126, which then terminates at back surface 146. Similarly, outer surface 130 of inner cone member 124 extends from at or near the rotational axis 134 radially outwardly towards the angled portion of inner surface 130 defining the friction surface, which then terminates at back surface 147.

Inner cone member 124 is moveable relative to outer cone member 122 along translation direction 140 that is substantially parallel to rotational axis 134. For ease of illustration, clutch assembly 106 is shown in FIG. 2 in a disengaged configuration, e.g., where the friction surface defined by outer surface 130 of inner cone member 124 is not in contact with friction member 126. To transition to an engaged configuration such as that shown in FIG. 3B, inner cone member 124 may be moved, e.g., under the control of controller 110, towards outer cone member 122 so that outer surface 130 engages friction member 126 on inner surface 132 of outer cone member 122. For example, spring 142 may be employed to apply an axial force to inner cone member 124 that moves inner cone member 124 towards outer cone member 122 so that outer surface 130 engages friction member 126 on inner surface 132 of outer cone member 122. Spring 142 is only one example of an actuation mechanism that may be employed by clutch assembly 106 to provide proper axial movement and axial load control, e.g., to allow for selective engagement and disengagement of clutch assembly 106.

The force applied by spring 142 (or other actuation mechanism) may allow for frictional engagement between the two opposing friction surfaces (outer surface of friction member 126 and outer surface 130 of inner cone member 124). The frictional engagement may allow for transfer of rotation between outer cone member 122 and inner cone member 124, e.g., so that input shaft 114 drives the rotation of output shaft 116. When engaged, the rotational speed of output shaft 116 may be approximately the same as input shaft 114 about axis 116. To disengage clutch assembly 106, the force applied by spring 142 (or other actuation mechanism) may be removed, e.g., under the control of controller 110, to allow for a gap between the two opposing friction surfaces (outer surface of friction member 126 and outer surface 130 of inner cone member 124). When disengaged, outer cone member 122 may rotate freely without rotating inner cone member 124. Although not shown, clutch assembly 106 may be a wet clutch with a fluid being delivered to the friction surfaces of outer cone member 122 and inner cone member 124. Alternatively, clutch assembly 106 may be a dry clutch. Examples of the disclosure may allow for liquid or gas (including air) cooling through the open structure core (e.g., through a lattice/porous core). Usually liquids may a better heat removal capacity. Liquids, such as oils, may also be chosen that double as a lubricant to the contacting/friction surfaces.

In accordance with some examples of the disclosure, one or both of inner cone member 124 and outer cone member 124 may be formed, at least in part, with a metallic shelled structure having an open structure core. For example, as shown in FIGS. 3A-4, at least a portion of outer cone member 124 includes first metallic layer 160 and second metallic layer 162 separate by open structure core 164. First metallic layer 160 may define all or a portion of outer surface 154 and second metallic layer 162 defines all or a portion of inner surface 132.

The combination of first metallic layer 160 and second metallic layer 162 separate by open structure core 164 form the portion of outer cone member 122 onto which friction material 126 is attached or otherwise provided on second metallic layer, which in the example of FIGS. 3A-4 includes inner surface 132. In other examples, the combination of first metallic layer 160 and second metallic layer 162 separate by open structure core 164 form the portion of outer cone member 122 directly defining a friction surface of cone clutch assembly 106, e.g., with the surface of second metallic layer 162 directly contacting an opposing friction surface of inner cone member 124 or a friction material attached to outer surface 130 of cone member 124. By using the metallic shelled sandwich structure to form the portion of outer cone member 122 nearest to the friction surface, heat generated from the friction, e.g., when in an engaged configuration, may be transferred away from the friction surface with a fluid flowing through open structure core 164 in the matter described herein.

First and second metallic layers 160 and 162 may be formed of or otherwise comprise, consist or consist essentially of any suitable metal or metal alloy. First metallic layer 160 may have the same composition as that of second metallic layer 162, or the compositions may be different. Example metal or metal alloys for first metallic layer 160 and second metallic layer 162 may include metal and metal alloys such as steel, aluminum and aluminum alloy, titanium and titanium alloy, and the like. A metallic material may be selected that exhibits relatively high strength, relatively low or minimum weight, and/or the ability to be additively manufacture successfully.

Open structure core 164 is positioned between first metallic layer 160 and second metallic layer 162. Rather than being a solid or relatively nonporous core material, core 164 defines one or a plurality of open pathways for a fluid to flow within core 164 between first metallic layer 160 and second metallic layer 162. For example, in the example of FIGS. 3A-4, a fluid (also referred to as a cooling fluid) may flow along pathway 150 within core 164.

In some examples, open structure core 164 may be a discontinuous layer of material having an open porosity or other open voids that allow for the fluid to flow through core 164 in the manner described herein. In some examples, open structure core 164 may have a lattice structure (e.g., a ceramic lattice or metallic lattice). The lattice structure may include a plurality of support structures between first metallic layer 160 and second metallic layer 162 with opening between the support structures. While the open structure of core 164 may allow for the cooling fluid to flow as described herein, core 164 may be structured withstand the forces applied during the operation of clutch assembly 106 (e.g., force opposing inner cone member 124 during engagement and/or centrifugal forces during rotation) without outer cone member 122 substantially deforming or failing in yield strength in a micro (individual lattice link) or macro (overall structure) strength.

The openings (or voids/pores) in core 164 may be at least partially connected to allow for the fluid to flow generally along pathway 150. As compared to a single cooling tunnel through a solid cone member, the cooling fluid may flow through a plurality of different small pathway that generally follow pathway 150 shown in FIGS. 3A-4. This may allow the cooling fluid to flow directly adjacent to first metallic layer 160 as well as the second metallic layer 162 within core 164. In some examples, core 164 may be a porous structure or structure otherwise defining voids between structural elements, e.g., in the case of lattice structure, where the overall porosity/void fraction defined by core 164 is at least about 20%, such as about 40% to about 60%. The overall porosity/void fraction defined by core 164 may allow for the flow of the cooling fluid within core 164 in the manner described herein. Other values are contemplated.

In some examples, the porosity or other void volumes defined within core 164 may be substantially uniform across the thickness T(3) of core 164. In other examples, core 164 may have a non-uniform porosity or other void volume across thickness T(3). For example, core 164 may have a higher void volume nearer first metallic layer 160 and/or second metallic layer 162 compared to the middle of core 164 along its thickness T(3). In this manner, the flow of the cooling fluid may be increased nearer first metallic layer 160 and/or second metallic layer 162 as compared to the middle of core 164, e.g., to increase the heat conducted into the fluid and/or the amount of heat removed by the cooling fluid when flowing within core 164.

Open structure core 164 may be formed of (e.g., comprise, consist or consist essentially of) any suitable material such as a ceramic and/or metallic (metal or metal alloy) material. Example ceramic materials may include any number of ceramic and ceramic composites with or without metallic alloys. Example metallic materials may include steel, aluminums, and the like. The material selected for open structure core 164 may exhibit an optimum or otherwise desired balance of properties such as strength, weight, heat transfer, and high temperature resilience. In some examples, core 164 may be formed from a porous material with the open porosity defining the flow pathways for the cooling fluid. In some examples, core 164 may be a lattice structure as described herein.

As described herein, heat from outer core member 122 may be conducted or otherwise transferred into the fluid flowing along pathway 150 to cool or otherwise remove heat from outer core member 122. For example, heat from first metallic layer 160, second metallic layer 162, and core 164 may be conducted into the fluid flowing along pathway 150. The flow of cooling fluid along pathway 150 within core 164 may be configured facilitate the removal of heat or otherwise cool outer cone member 122, e.g., during operation of cone clutch assembly 106. For example, assembly 106 may be configured such that a cooling fluid (e.g., a cooling oil) is delivered to inlet port 144 during operation of clutch assembly 106 in the engaged and/or disengaged configuration. The fluid delivered through inlet port 144 may flow along pathway 150 within core 164 (e.g., at least in part by centrifugal forces associated with the rotation of cone member 122 about axis 134), and then transferred adjacent to the friction surface of outer cone member 122 so that heat may be conducted into the fluid from outer cone member 122 (e.g., as generated at the friction surface). The cooling fluid may travel through core 164 and exit at an outlet in back surface 149 of outer cone member 122. Additionally, or alternatively, the fluid may flow out of outlet holes such as weeping holes 156A and 156B in first metallic layer 160. The removal of the heat by the fluid 150 may provide for cooling of cone member 122 with the removal of heat as described. Beneficially, the centrifugal force applied on fluid flowing with core 164 by the rotation of cone member 122 may drive the flow of the fluid along pathway 150 without the need for a pump to drive the flow fluid during operation of clutch assembly 106 in an engaged configuration and/or disengaged configuration.

Any suitable cooling fluid may be employed. Example cooling fluids may include a cooling oil with a relatively high heat capacity. Fluid 150 may be liquid fluid or a gas such as air. In some examples, cooling fluid 150 may be selected based on properties such as lubricity, heat transfer, degradation resistance, wear particle suspension, and the like. In the case of a wet clutch, the cooling fluid may be the oil or other liquid fluid that also functions as the lubricating fluid in the wet clutch.

In the example of FIGS. 3A-4, the cooling fluid enters open structure core 164 by inlet port 144 formed in second metallic layer 162 near the inner diameter/rotational axis 134 of outer cone member 122. Such a position may allow for the lubricating fluid of a wet clutch operation to function as the cooling fluid as well. The inlet to core 164 may be located in a position different than that shown in FIGS. 3A and 3B. Moreover, while some examples of the disclosure allow for the flow of the cooling fluid as least in part due to the centrifugal forces resulting from the rotation of outer cone member 122 without the use of a pump, in some examples, clutch assembly 106 may employ a pump to at least partially drive the flow of the cooling fluid into, through, and/or out of core 164. For example, a pump may be employed to at least partially drive the flow of the cooling fluid into, through, and/or out of core 164, e.g., in instances in which added cooling (e.g., with increased flow rate), flow of the cooling fluid when outer cone member 122 is not rotating, and/or added lubrication is desired.

As noted above, in some examples, first metallic layer 160 may optionally include at least one weeping hole such as weeping holes 156A and 156B labelled in FIGS. 2-3B (collectively and individually referred to as weeping hole(s) 156) extending through first metallic layer 160 to core 164. In some examples, outer cone member 122 may only include a single weeping hole 156 while in other examples, outer cone member 122 includes a plurality of individual weeping holes, such as the example of FIG. 2 with a plurality of cooling holes 156 distributed both axially and about the outer circumference of first metallic layer 160 of outer cone member 122. Weeping hole(s) 156 may provide a pathway for the fluid in core 164 to flow out of core 164 rather than out of the outlet at back surface 146. In some examples, the weeping holes 156 allow for a larger volume of cooling fluid to flow out of outer cone member 122 (e.g., to allow for a greater flow rate into core 164) and, thus, increase cooling of outer cone member 122 as compared to instances in which the cooling fluid only flows out of back surface 156. In some examples, weeping hole(s) 156 are included as the fluid outlet without an outlet at back surface 156.

The cooling fluid that flows out of core 164 through weeping hole(s) 156 and/or back surface 156 may be captured (and optionally cooled by a heat exchanger), filtered, and then recycled back into the system (e.g., in the case of a cooling liquid). In the case of a gas fluid, the gas may be recaptured, cooled (e.g., in a heat exchanger), and recycled in some examples. In the case of air fluid, the air may be released from the system and new air may be used for the supply.

With reference to FIG. 4, first metallic layer 160 and second metallic layer 162 may have any suitable thicknesses, T(1) and T(2), respectively. Thickness T(1) and T(2) may be substantially the same or different from each other, e.g., with T(2) being thicker than T(1), or vice versa. In some examples, each of thickness T(1) and T(2) may be substantially constant over the length of the respective layer, or one or more of thickness T(1) and T(2) may vary in thickness, e.g., with portions being thicker and other portions being thinner. In some examples, T(1) may be at least about 0.020 inches and T(2) may be at least about 0.020 inches. The thicknesses T(1) and T(2) may be selected to provide for sufficient stiffness and strength, and may depend on the overall size and/or other properties of clutch assembly 106.

Open structure core 164 may have any suitable thickness T(3). In some examples, thickness T(3) is greater than one or both of T(1) and T(2). Core thickness T(3) may be substantially constant over the length along which fluid pathway 150 follows, or may vary in thickness, e.g., with portions being thicker and other portions being thinner. In some examples, core thickness T(3) may be at least about 100% or greater, or at least about 200% or greater, or at least about 300% or greater, such as at least about 4 times greater or at least about 5 time greater, than T(1) and/or T(2). The thickness T(3) may be selected based on the flow rater of the cooling fluid through core 164, the lattice or other open structure design, and/or the overall size and/or other properties of clutch assembly 106.

The combined thickness of first layer 160, second layer 162 and core 164 may define the overall thickness of outer cone member 122.

Other values than those described herein are contemplated.

Figure 5:
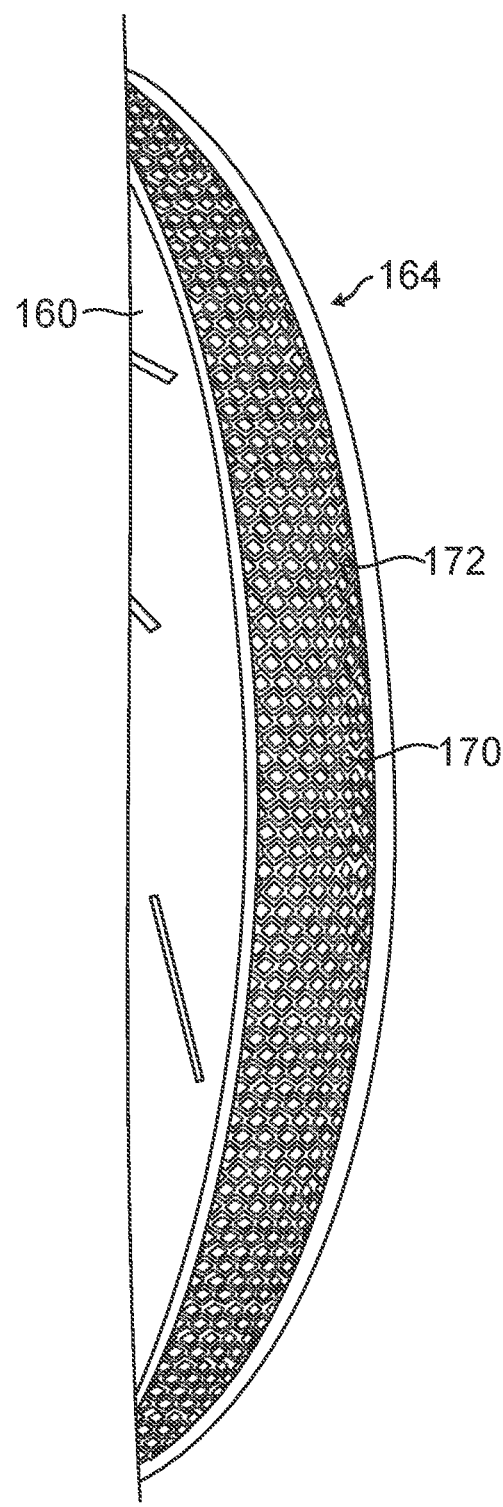
FIG. 5 is an image showing an example metallic shelled sandwich structure.

FIG. 5 is an image showing an example metallic shelled sandwich structure that may be used to form outer cone member 122 and/or inner cone member 124, as described herein. FIG. 5 shows open structure core 164 positioned between first metallic layer 160 and a second metallic layer (not shown). Open structure core 164 shown in FIG. 5 may be an example ceramic lattice structure that may be employed in some examples of the disclosure. Core 164 defines open voids 170 between the lattice supports 172.

Any suitable technique may be employed to form cone member(s), such as, outer cone member 122, having a metallic shelled sandwich structure with an open structure core. In some examples, open structure core 164 may be additively manufactured onto first metallic layer 160 or second metallic layer 162, e.g., using a suitable additive manufacturing technique such as laser powder bed fusion. Once the additively manufacture open structure core 164 is formed, the other of the first metallic layer 160 or second metallic layer 162 may be positioned on the surface of core 164 opposite the other metallic layer. In some examples, first metallic layer 160 may be additively manufacture with the desired metal or metal alloy material. The ceramic composite material may then be employed to print or otherwise form open structure (e.g., latticed) core 164 on layer 160 (e.g., using the same additive manufacturing apparatus). After core 164 is formed, second metallic layer 162 may be printed or otherwise deposited with the desired metal or metal alloy on core 164 (e.g., using the same additive manufacturing apparatus). The process may be used to fabricate outer cone member 122.

Figure 6:
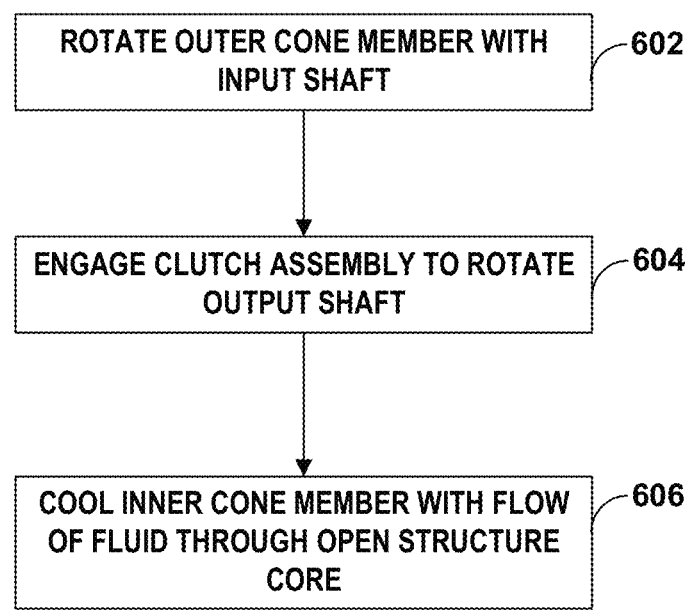
FIG. 6 is a flow diagram illustrating an example technique for operating a system including a cone clutch assembly in accordance with some examples of the disclosure.

FIG. 6 is a flow diagram illustrating an example technique for controlling engagement of an engine with an accessory using a cone clutch assembly. Using the technique of FIG. 6, controller 110 may control system 100 to selectively transfer rotational motion from accessory gear box 104 to accessory component 108 via clutch assembly 106 while also cooling clutch assembly 106 as described herein. For ease of description, the example of FIG. 6 will be described with regard to system 100 and cone clutch assembly 106 described above with regard to FIGS. 2, 3A, 3B, and 4. However, the technique may be used to control other systems and clutch assemblies. Additionally, system 100 and cone clutch assembly 106 may be controlled using other techniques.

The technique illustrated in FIG. 6 may include rotating outer cone member 122 around rotational axis 134 by the rotation of input shaft 112 (602). As discussed above, engine 102 may be configured to rotate input shaft 112, e.g., via drive shaft 112, accessory gear box 104, and input shaft 114. Inner cone member 124 may be disengaged from outer cone member 122 during the rotation of outer cone member 122, e.g., with spring 142 not applying an axial force that forces the friction face of inner cone member 124 against friction member 126 of outer cone member 122. As described above, when disengaged, a gap may be present between the respective friction surfaces of inner cone member 124 and outer cone member 122.

Controller 110 may then selectively engage clutch assembly 106 to transfer rotational motion from input shaft 114 to output shaft 116, e.g., to drive accessory 108 (604). For example, controller 110 may actuate spring 142 to apply an axial force to inner cone member 124 that moves inner cone member 124 towards outer cone member 122 so that outer surface 130 engages friction member 126 on inner surface 132 of outer cone member 122. The applied force may allow for frictional engagement between the two opposing friction surfaces (outer surface of friction member 126 and outer surface 130 of inner cone member 124). The frictional engagement may allow for transfer of rotation between outer cone member 122 and inner cone member 124, e.g., so that input shaft 114 drives the rotation of output shaft 116.

During the engagement of inner cone member 124 and outer cone member 122, a cooling fluid may flow into inlet port 144 into core 164 and flow along pathway 150 within core 164 to cool or otherwise remove head from outer cone member 122 (606). For example, the cooling fluid may flow radially outward within core 164 to flow generally along pathway 150, e.g., based on the centrifugal force associated with the rotation of outer cone member 122. At least a portion of the fluid may flow through inlet port 144 and exit out back surface 146 of outer cone member 122 to remove heat from outer cone member 122. In examples in which outer cone member 111 includes optional weeping holes 156, at least a portion of the fluid may exit core 164 out weeping holes 156 to remove heat from outer cone member 122.

In some examples, controller 110 may control the flow of the cooling fluid through core 164. For example, the flow of the cooling fluid may be indirectly controlled by controller 110 by controlling the rotation of outer cone member 122 (e.g., in terms of rate of rotation) and, thus, the centrifugal forces driving the flow of the cooling fluid along pathway

150. In other examples, controller 110 may more directly control the flow of the cooling fluid, e.g., by controlling the operation of a pump device configured to selectively pump the cooling fluid into and/or through core 164. Additionally, or alternatively, inlet port 144 that acts as the fluid inlet may be selectively opened and closed, e.g., with a valve or other device, under the control of controller 110 to selectively allow fluid to flow within core 164.

In some examples, controller 110 may cause the fluid to front surface 155 when inner cone member 124 is engaged with outer cone member 122, e.g., with the flow of fluid being ceased with inner cone member disengages from outer cone member 122. Alternatively, or additionally, system 106 may include a temperature sensor so that fluid may be selectively allowed to flow within core 164 to cool inner cone member 124 whenever outer cone member 122 reaches a temperature above a predetermined threshold.

Controller 110 may control the delivery of the cooling fluid through core 164 in a manner that provides for a desired amount of heat removal from outer cone member 122, e.g., to reduce the temperature, maintain the temperature, or reduce the rate of temperature increase of outer cone member 122. In some examples, controller 110 may increase or decrease the amount of fluid flowing through core 164 to increase or decrease, respectively, the amount or rate of heat remover from outer cone member 122, as desired. In some examples, liquid or gas cooling/lubricating fluid needs to flow whenever cones 122 and 124 are slipping relative to each other.

Various examples have been described. These and other examples are within the scope of the following clauses and claims.

Clause 1. A cone clutch assembly comprising: an inner cone member configured to be rotationally coupled to a first shaft, the inner cone member defining a first friction surface; and an outer cone member configured to be rotationally coupled to a second shaft, the outer cone member defining a second friction surface opposing the first friction surface, wherein the inner cone member and outer cone member are configured to be selectively engaged and disengaged from each other, wherein, when the inner cone member is engaged with the outer cone member, the first friction surface of the inner cone member frictionally engages the second friction surface of the outer cone member such that rotational motion is transferred between the inner cone member and the outer cone member, and wherein at least one of the inner cone member or the outer cone member include a first metallic layer and a second metallic layer separated by an open structure core, wherein the open structure core is configured to allow flow of a fluid between the first metallic layer and the second metallic layer to remove heat from the at least one of the inner cone member or the outer cone member.

Clause 2. The clutch assembly of clause 1, further comprising the fluid.

Clause 3. The clutch assembly of clauses 1 or 2, wherein the assembly is configured such that the fluid enters the open structure core via one or more inlet ports in at least one of the first metallic layer and the second metallic layer to flow between the first metallic layer and the second metallic layer.

Clause 4. The clutch assembly of any one of clauses 1 to 3, wherein the second metallic layer includes at least one outlet hole, wherein at least a portion of the fluid that flows between the first metallic layer and the second metallic layer is configured to flow out of the open structure core via the at least one outlet hole in the second metallic layer.

Clause 5. The clutch assembly of any one of clauses 1 to 4, wherein the fluid is configured to lubricate the first friction surface and the second friction surface.

Clause 6. The clutch assembly of any one of clauses 1 to 5, wherein the fluid is configured to flow in the open structure core between the first metallic layer and the second metallic layer in part due to centrifugal forces applied on the fluid with rotation of the at least one of the inner cone member or the outer cone member.

Clause 7. The clutch assembly of any one of clauses 1 to 6, further comprising a friction material on the first metallic layer, the friction material defining one of the first friction surface or the second friction surface.

Clause 8. The clutch assembly of any one of clauses 1 to 7, wherein the first metallic layer and the second metallic layer are formed of the same metal or metal alloy.

Clause 9. The clutch assembly of any one of clauses 1 to 8, wherein the open structure core comprises a ceramic or metal.

Clause 10. The clutch assembly of any one of clauses 1 to 9, wherein the open structure core comprises a ceramic lattice core.

Clause 11. The clutch assembly of any one of clauses 1-8, further comprising a controller including control circuitry, wherein the controller is configured to selectively engage and disengage the inner cone member and the outer cone member from each other.

Clause 12. A method of operating a cone clutch assembly, the method comprising: engaging an inner cone member with the outer cone member, wherein the inner cone member is rotationally coupled to a first shaft and defines a first friction surface, wherein the outer cone member is rotationally coupled to a second shaft and defines a second friction surface opposing the first friction surface, wherein, when the inner cone member is engaged with the outer cone member, the first friction surface of the inner cone member frictionally engages the second friction surface of the outer cone member such that rotational motion is transferred between the inner cone member and the outer cone member, and wherein at least one of the inner cone member or the outer cone member include a first metallic layer and a second metallic layer separated by an open structure core, wherein the open structure core is configured to allow flow of a fluid between the first metallic layer and the second metallic layer to remove heat from the at least one of the inner cone member or the outer cone member.

Clause 13. The method of clause 12, wherein, when the inner cone member is engaged with the outer cone member, the fluid flows within the open structure core to remove heat from the at least one of the inner cone member or the outer cone member.

Clause 14. The method of clauses 12 or 13, wherein the assembly is configured such that the fluid enters the open structure core via one or more inlet ports in at least one of the first metallic layer and the second metallic layer to flow between the first metallic layer and the second metallic layer.

Clause 15. The method of any one of clauses 12 to 14, wherein the second metallic layer includes at least one outlet hole, wherein at least a portion of the fluid that flows between the first metallic layer and the second metallic layer is configured to flow out of the open structure core via the at least one outlet hole in the second metallic layer.

Clause 16. The method of any one of clauses 12 to 15, further comprising lubricating, with the fluid, the first friction surface and the second friction surface.

Clause 17. The method of any one of clauses 12 to 16, wherein the fluid is configured to flow in the open structure core between the first metallic layer and the second metallic layer in part due to centrifugal forces applied on the fluid with rotation of the at least one of the inner cone member or the outer cone member.

Clause 18. The method of any one of clauses 12 to 17, wherein a friction material is on the first metallic layer, the friction material defining one of the first friction surface or the second friction surface.

Clause 19. The method of any one of clauses 12 to 18, wherein the first metallic layer and the second metallic layer are formed of the same metal or metal alloy.

Clause 20. The method of any one of clauses 12 to 19, wherein the open structure core comprises a ceramic or metal.

Clause 21. The method of any one of clauses 12 to 20, wherein the open structure core comprises a ceramic lattice core.

Clause 22. The method of any one of clauses 12 to 21, further comprising selectively engaging and disengaging the inner cone member and the outer cone member from each other using control circuitry.

What is claimed is:

1. A cone clutch assembly comprising:
   an inner cone member configured to be rotationally coupled to a first shaft, the inner cone member defining a first friction surface; and
   an outer cone member configured to be rotationally coupled to a second shaft, the outer cone member defining a second friction surface opposing the first friction surface,
   wherein the inner cone member and outer cone member are configured to be selectively engaged and disengaged from each other,
   wherein, when the inner cone member is engaged with the outer cone member, the first friction surface of the inner cone member frictionally engages the second friction surface of the outer cone member such that rotational motion is transferred between the inner cone member and the outer cone member, and
   wherein at least one of the inner cone member or the outer cone member include a first metallic layer and a second metallic layer separated by an open structure core, wherein the open structure core is configured to allow flow of a fluid between the first metallic layer and the second metallic layer to remove heat from the at least one of the inner cone member or the outer cone member, and
   wherein the assembly is configured such that the fluid enters the open structure core via one or more inlet ports in at least one of the first metallic layer or the second metallic layer to flow between the first metallic layer and the second metallic layer.

2. The clutch assembly of claim 1, further comprising the fluid.

3. The clutch assembly of claim 1, wherein the second metallic layer includes at least one outlet hole, wherein at least a portion of the fluid that flows between the first metallic layer and the second metallic layer is configured to flow out of the open structure core via the at least one outlet hole in the second metallic layer.

4. The clutch assembly of claim 1, wherein the fluid is configured to lubricate the first friction surface and the second friction surface.

5. The clutch assembly of claim 1, wherein the fluid is configured to flow in the open structure core between the first metallic layer and the second metallic layer in part due to centrifugal forces applied on the fluid with rotation of the at least one of the inner cone member or the outer cone member.

6. The clutch assembly of claim 1, further comprising a friction material on the first metallic layer, the friction material defining one of the first friction surface or the second friction surface.

7. The clutch assembly of claim 1, wherein the first metallic layer and the second metallic layer are formed of the same metal or metal alloy.

8. The clutch assembly of claim 1, wherein the open structure core comprises a ceramic or metal.

9. The clutch assembly of claim 1, wherein the open structure core comprises a ceramic lattice core.

10. The clutch assembly of claim 1, further comprising a controller including control circuitry, wherein the controller is configured to selectively engage and disengage the inner cone member and the outer cone member from each other.

11. A method of operating a cone clutch assembly, the method comprising:
    engaging an inner cone member with an outer cone member, wherein the inner cone member is rotationally coupled to a first shaft and defines a first friction surface, wherein the outer cone member is rotationally coupled to a second shaft and defines a second friction surface opposing the first friction surface,
    wherein, when the inner cone member is engaged with the outer cone member, the first friction surface of the inner cone member frictionally engages the second friction surface of the outer cone member such that rotational motion is transferred between the inner cone member and the outer cone member, and
    wherein at least one of the inner cone member or the outer cone member include a first metallic layer and a second metallic layer separated by an open structure core, wherein the open structure core is configured to allow flow of a fluid between the first metallic layer and the second metallic layer to remove heat from the at least one of the inner cone member or the outer cone member, and
    wherein the assembly is configured such that the fluid enters the open structure core via one or more inlet ports in at least one of the first metallic layer or the second metallic layer to flow between the first metallic layer and the second metallic layer.

12. A cone clutch assembly comprising:
    an inner cone member configured to be rotationally coupled to a first shaft, the inner cone member defining a first friction surface; and
    an outer cone member configured to be rotationally coupled to a second shaft, the outer cone member defining a second friction surface opposing the first friction surface,
    wherein the inner cone member and outer cone member are configured to be selectively engaged and disengaged from each other,
    wherein, when the inner cone member is engaged with the outer cone member, the first friction surface of the inner cone member frictionally engages the second friction surface of the outer cone member such that rotational motion is transferred between the inner cone member and the outer cone member,
    wherein at least one of the inner cone member or the outer cone member include a first metallic layer and a second metallic layer separated by an open structure core, wherein the open structure core is configured to allow flow of a fluid between the first metallic layer and the second metallic layer to remove heat from the at least one of the inner cone member or the outer cone member, and wherein the second metallic layer includes at least one outlet hole, wherein at least a portion of the fluid that flows between the first metallic layer and the second metallic layer is configured to flow out of the open structure core via the at least one outlet hole in the second metallic layer.

13. The clutch assembly of claim 12, further comprising the fluid.

14. The clutch assembly of claim 12, wherein the fluid is configured to lubricate the first friction surface and the second friction surface.

15. The clutch assembly of claim 12, wherein the fluid is configured to flow in the open structure core between the first metallic layer and the second metallic layer in part due to centrifugal forces applied on the fluid with rotation of the at least one of the inner cone member or the outer cone member.

16. The clutch assembly of claim 12, further comprising a friction material on the first metallic layer, the friction material defining one of the first friction surface or the second friction surface.

17. The clutch assembly of claim 12, wherein the first metallic layer and the second metallic layer are formed of the same metal or metal alloy.

18. The clutch assembly of claim 12, wherein the open structure core comprises a ceramic or metal.

19. The clutch assembly of claim 12, wherein the open structure core comprises a ceramic lattice core.

20. The clutch assembly of claim 12, further comprising a controller including control circuitry, wherein the controller is configured to selectively engage and disengage the inner cone member and the outer cone member from each other.

* * * * *